M. VON RECKLINGHAUSEN.
VAPOR ELECTRIC APPARATUS.
APPLICATION FILED JUNE 13, 1913.

1,110,575.

Patented Sept. 15, 1914.
2 SHEETS—SHEET 1.

M. VON RECKLINGHAUSEN.
VAPOR ELECTRIC APPARATUS.
APPLICATION FILED JUNE 13, 1913.
1,110,575.
Patented Sept. 15, 1914.
2 SHEETS—SHEET 2.
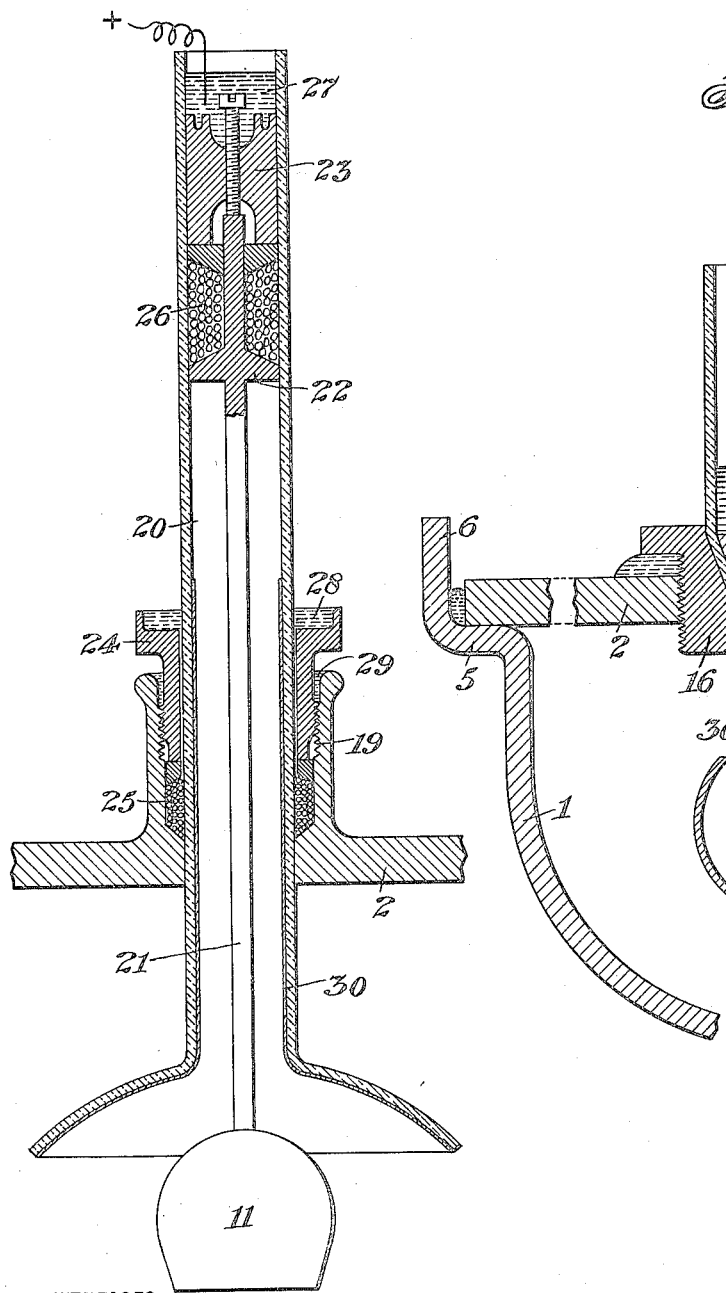
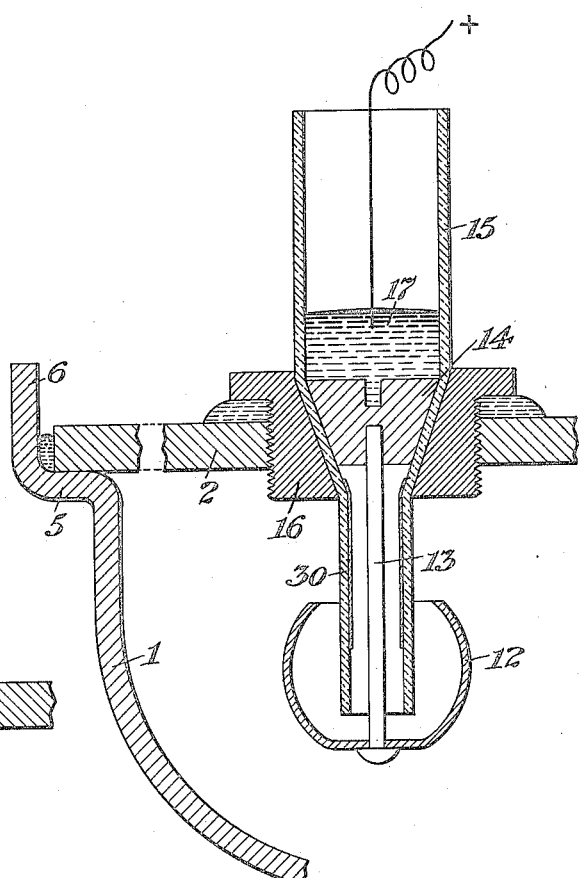

UNITED STATES PATENT OFFICE.

MAX von RECKLINGHAUSEN, OF PARIS, FRANCE, ASSIGNOR TO COOPER HEWITT ELECTRIC COMPANY, OF HOBOKEN, NEW JERSEY, A CORPORATION OF NEW JERSEY.

VAPOR ELECTRIC APPARATUS.

1,110,575.  Specification of Letters Patent.  Patented Sept. 15, 1914.

Original application filed November 12, 1903, Serial No. 180,965. Divided and this application filed June 13, 1913. Serial No. 773,381.

*To all whom it may concern:*

Be it known that I, MAX VON RECKLINGHAUSEN, a subject of the Emperor of Germany, and resident of Paris, France, have invented certain new and useful Improvements in Vapor Electric Apparatus, of which the following is a specification.

When it is desired to construct and use vapor converters such as are represented by the well known mercury vapor apparatus of this class, it is often advantageous, especially when apparatus of large capacity is required to construct the devices mainly of metal and to maintain electrodes within the devices, the negative electrode being as a rule in contact with the body of the container, and the positive electrode or electrodes being insulated by any suitable means from the said body. The problem of constructing efficient apparatus under these conditions involves questions of insulation and sealing and other similar matters all of which are highly important to the successful operation of the devices and to the maintaining of the requisite high vacuum inside the containing vessel. The question of short circuits also arises and means generally have to be provided whereby such short circuits may be avoided.

The present invention relates to a novel form of apparatus of the general character set forth above, and its details will be fully described in the present specification and illustrated in the accompanying drawings.

Figure 1:
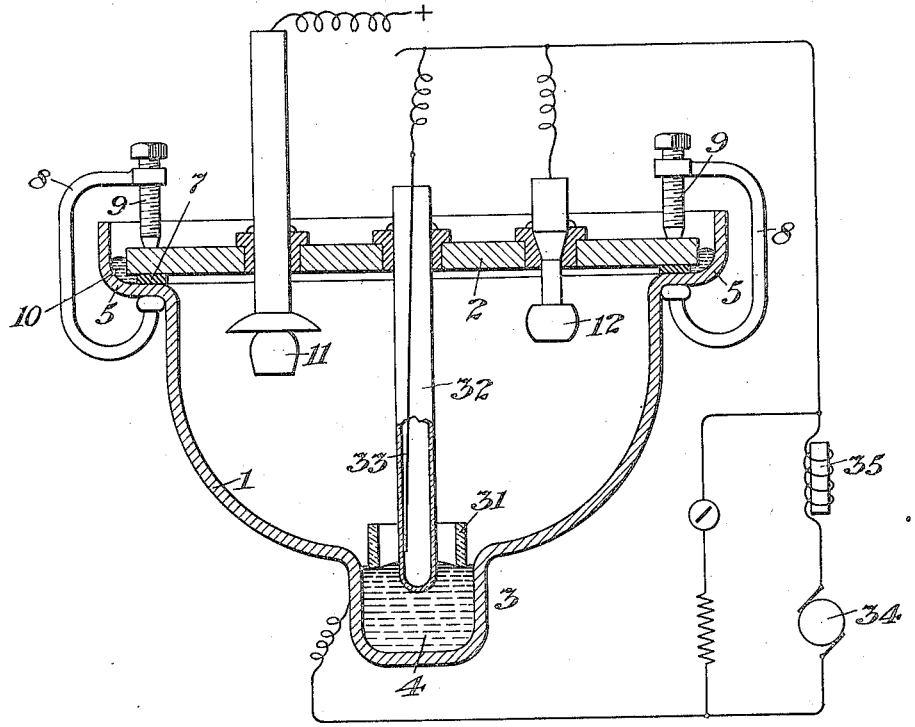
Figure 2:
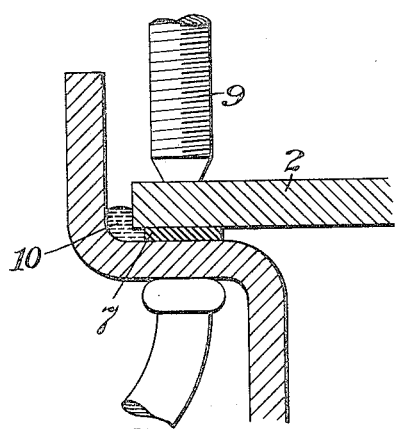
Figure 3:
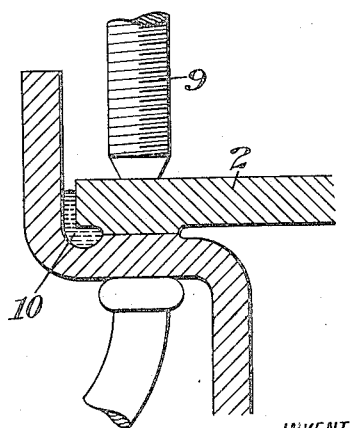

In the drawings, Figure 1 is a vertical section through my improved vapor converter, showing also a diagram of circuits which may be employed in connection therewith; Figs. 2 and 3 are detail views showing different modes of securing an efficient seal for the apparatus; Fig. 4 is an enlarged detail view showing means for supporting and insulating one of the positive electrodes of the apparatus and preventing short circuits; and Fig. 5 illustrates a modified construction for the same purposes.

Referring to the drawings, 1 is a vessel of metal, preferably steel or copper, and 2 is a cap or cover of the same material as the vessel. At the bottom of the vessel 1 is formed a cup, 3, containing mercury, 4, constituting the negative electrode of the apparatus. The mercury is in direct contact with the metal of the vessel 1, which may accordingly be itself considered a portion of the negative electrode. As a means for securing a good seal as between the vessel and the cap or cover 2, I may provide the vessel with a shoulder, 5, and a flange, 6, and may, as illustrated in Fig. 3, press the cap upon the shoulder 5 so as to produce a ground joint, or I may interpose, as shown in Fig. 2, a strip or ring, 7, of asbestos or other suitable packing, pressure being applied in each instance to secure a good connection by means of clamps, 8, 8, secured by screw bolts, 9, 9. To complete the seal, I prefer to add mercury, as shown at 10, whereby a perfect seal is produced, capable of sustaining with the containing vessel a very high vacuum. In the present instance I have shown two positive electrodes 11 and 12, and have illustrated more particularly in Figs. 4 and 5 means for supporting and insulating the said electrodes with respect to the cap or cover 2. In Fig. 5, for example, the electrode 12 is formed on or supported by a rod, 13, which is screw threaded at its top and connected by such screw thread with a cone shaped metallic piece, 14, the latter is set into a tube, 15, of glass or other good insulating material, the same being shaped internally to receive and form a good joint with the metallic piece 14 at a point substantially in line with the top of the cap or cover 2. Below the junction between the parts 14 and 15 the latter is formed into a tube of cylindrical shape surrounding the rod 13. In other words, the tube 15 consists of two cylindrical portions of differing diameters connected by an inclined portion adapted to surround and fit the metal piece 14. The inclined portion of the tube 15 is itself surrounded by a screw bushing, 16, capable of being screwed into the cap or cover 2, as shown. Electrical connection with the positive side of the circuit is made through the mercury, 17, placed in the upper part of the tube 15 and resting on the metallic piece 14. The mercury 17 serves not only as a circuit connection but also as a seal, as will be readily understood. I also place mercury outside the tube 15 at the annulus where it is surrounded by the nut or washer, 16, and I also apply mercury to the junction point between the flange 18, at the top of the said nut, and the cap or cover 2.

In Fig. 4 another mode of support and insulation for the positive electrode is shown. Here the cover 2 is provided with a cylinder, 19, which may be formed on said cover, and a tube 20, of glass or other good insulating material, passes down through this cylinder and through the cover itself into the chamber of the container. The electrode 11 is mounted on a rod, 21, which is shouldered at 22 and screw threaded at the top to enter a metallic support, 23, within the tube 20. The cylinder 19 has a screw thread connection with the nut 24 which immediately surrounds the tube 20. Between the walls of the tube 20 and the cylinder 19 on the outside is a packing of asbestos or similar material and between the inner walls of the said tube and the rod 21 is a similar packing, the two packings being shown respectively at 25 and 26. By suitable adjustment of the packings 25 and 26, the tube 20 may be firmly held in position while by means of mercury seals, 27, 28 and 29, all leakage of air into the containing vessel will be avoided.

It is found in operating devices of this class, particularly where the vacuum is for any reason imperfect, that the film of mercury is liable to be formed on the insulating tube which surrounds the positive electrode supports and that this film if carried far enough may cause a short-circuit between the positive and the negative electrodes. To avoid this I may arrange the positive electrode as indicated in Fig. 5 where it is formed into an upright cup on the lower end of the rod 13 and located so as to surround the lower end of the insulating tube 15. Owing to the great heat which is developed at the positive electrode, the lower end of the tube 15 will be so highly heated by the radiation or convection from the electrode 12 that no condensation of mercury will take place at that part of the tube. Consequently there will be no opportunity for the short circuit under such conditions. I have indicated at 30 a film of mercury due to the condensation as described, showing, however, the lower end of the tube 15 free from such a film.

Another mode of preventing the film from causing a short-circuit is indicated in Fig. 5 where the tube 20 is made to project so far above the electrode 11 that it leaves a space toward the top of the tube which is too remote for the deposition of mercury to take place. In other words, the mercury of condensation is all deposited on the inner walls of the tube before it reaches a point where it might cause or come into contact with the rod 21, even though such rod might touch the tube near its upper end.

A further danger which is to be guarded against in the operation of these vapor converters is due to the development at the negative electrode of what is known as negative electrode flame. There appears to be a tendency for such a flame to attach itself to the solid portions surrounding the negative electrode, and this leads to a disintegration of the surrounding portion in case it is formed of metal. By introducing into the cup containing the mercury constituting the negative electrode, a ring of porcelain or the like, as shown at 31, and by starting the flame inside the said ring, the flame can be prevented from attacking the metal and the difficulty mentioned above can be avoided.

To insure the proper starting of the device into operation, I may pass through the cap 2 a glass or porcelain tube, 32, a suitable packing box being provided for insuring a good seal. This packing box may be similar to either of those already described in connection with the insulating tubes surrounding the positive electrode leads. Into the tube 32 I may insert a wire, 33, and cause its lower end to impinge against the inner wall of the tube at or near the surface of the mercury electrode 4. The wire may be connected in any suitable manner with the positive side of the circuit, when it forms what may be called an internal starting band, acting on the same principle as the starting band described in certain patents issued to Mr. Peter Cooper Hewitt on the 17th day of September, 1901. For the sake of clearness I have shown a direct current generator, 34, having one pole connected to the negative electrode 4 and the opposite pole connected to the positive electrodes 11 and 12 and also to the wire 33. In the circuit is included an inductance device, 35, and a snap or quick-break switch, 36, is connected in a shunt circuit around the said inductance device. I may include a resistance, 37, in this shunt circuit. The action of starting the converter is now well-known, but I may say that on operating the switch, 36, whose terminals are usually placed under oil, the shunt circuit is broken, the energy stored in the inductance 35 is discharged through the converter, thereby starting the apparatus into operation. The operation continues by virtue of the current from the generator 34.

I have mentioned asbestos as a suitable material for the packing illustrated at 25 and 26, but owing to the fact that the presence of carbon in a converter of this kind is injurious, I prefer that asbestos, if used, should first have its rubber binder burnt out, thus removing the carbon. In general, I do not wish to confine myself to the use of asbestos, and may use any material which is in such mechanical condition that it can be used as a packing, preferably, however, non-carboniferous material. I may indeed use packings in powdered form, such as powdered magnesia or the like. It is only necessary, besides the other conditions mentioned, that the material used as the packing should be flexible and compressible, preferably without carbon in it or associated with it.

This application is a division of my application Serial Number 180,965, filed November 12, 1903, and a companion to my application Serial Number 588,166, filed October 20, 1910, which is also a division of the first named application.

I claim as my invention:

1. In a vapor electric apparatus the combination with an exhausted container, an anode therein, and a supporting stem for said anode, of an insulating piece insulating said stem from said container and protecting the length of said stem within said container, said anode covering the end of said insulating piece.

2. In a vapor converter the combination with a hollow electrode and its leading-in conductor, of an insulating tube surrounding the conductor and having its end surrounded by the electrode.

3. In a vapor electric apparatus the combination with an exhausted container, an anode therein, and a supporting stem for said anode, of an insulating piece insulating said stem from said container and protecting the length of said stem within said container, said electrode protecting the end of said insulating piece.

4. The combination with an exhausted container and electrodes therein, a supporting body for one of said electrodes and an insulating surface exposed within the container separating said electrode from said container whereby a portion of the said surface is covered and protected from actions within the container and an undeteriorated area is secured.

5. In a vapor apparatus, a conducting container, said container being exhausted to a high degree, an electrode therein, and insulating material between said container and said electrode, together with means for maintaining a portion of the surface of the insulating material exposed to the exhausted space, in effective condition.

6. The combination with an exhausted container, the major part of which is of conducting material, an electrode therein and insulating material between said container and said electrode, of a source of heat and means for utilizing heat from said source for preventing interference with the operation at said electrode on account of mercury condensed in said chamber.

7. In a vapor converter, a metallic body constituting part of the converter, a positive electrode insulated from said body by a suitable insulating piece, the electrode being in close proximity to a portion of the insulating support whereby the said support is kept too highly heated to receive a deposition of mercury, as and for the purpose set forth.

Signed at New York, in the county of New York, and State of New York, this 11th day of June, A. D. 1913.

MAX von RECKLINGHAUSEN.

Witnesses:
WM. H. CAPEL,
THOS. W. BROWN.